United States Patent [19]

Hunt

[11] Patent Number: 5,123,787
[45] Date of Patent: Jun. 23, 1992

[54] MACHINING TOOL

[75] Inventor: Carl E. Hunt, White Lake, Mich.

[73] Assignee: GTE Valenite Corporation, Troy, Mich.

[21] Appl. No.: 660,061

[22] Filed: Feb. 25, 1991

[51] Int. Cl.⁵ .............................................. B23C 5/24
[52] U.S. Cl. ........................................ 407/39; 407/83; 407/89; 408/180
[58] Field of Search ............... 407/36, 37, 38, 39, 407/44, 81, 82, 83, 84, 89, 90; 408/180; 409/216

[56] References Cited

U.S. PATENT DOCUMENTS

| | | | |
|---|---|---|---|
| 2,440,978 | 5/1948 | Schlenkert | 407/44 X |
| 4,428,704 | 1/1984 | Kalokhe | 407/37 X |
| 4,470,731 | 9/1984 | Erkfritz | 407/38 |
| 4,547,100 | 10/1985 | Naccarato et al. | 407/39 |
| 4,692,069 | 9/1987 | Kieninger | 407/39 |
| 4,848,977 | 7/1989 | Kieninger | 407/39 |

FOREIGN PATENT DOCUMENTS

| | | | |
|---|---|---|---|
| 0426761 | 2/1975 | U.S.S.R. | 407/83 |
| 0904900 | 2/1982 | U.S.S.R. | 407/83 |

Primary Examiner—Z. R. Bilinsky
Attorney, Agent, or Firm—Bill C. Panagos

[57] ABSTRACT

A machining tool to be mounted upon a cutter body, the machining tool including a cartridge for mounting upon the cutter body and an anvil rotatably affixed to the cartridge, the anvil including a pocket into which is affixed a cutting insert for rotation with the anvil.

17 Claims, 2 Drawing Sheets

MACHINING TOOL

BACKGROUND OF THE INVENTION

1. Field of the Invention

The present invention relates to a machining tool for use with a cutter body. The machining tool includes a cartridge having a recessed area to which an anvil is rotatably affixed. The anvil includes a recessed area into which a cutting insert is affixed. Such a cutting insert is of the type commonly made of a cemented metal carbide such as tungsten carbide which is formed by pressing techniques and sintered. The machining tool also includes means for causing a surface of the anvil to slide upon a corresponding surface of the cartridge to rotate the anvil and cutting insert affixed thereto relative to the cartridge about a common axis.

2. Description of the Prior Art

In modern day machining operations higher and higher speeds are achieved. At whatever levels, however, each application must be evaluated in terms of a wide range of variables, and of the potential safety hazards that are involved. This is particularly true with respect to high speed applications. In developing machining equipment it is desirable to improve feed rates and part surface finish in the same cut without creating safety hazards. When using modular milling equipment which include the use of cartridges which are coupled to a cutter body it is desirable that such improvements be accomplished by providing a cartridge which is economical to manufacture, easy to use, and which will accommodate existing cutting inserts. To achieve the desired finish and feed rate in the same cut it has been found necessary to qualify the manufacturing tolerances of the cutting insert and cartridge to which it is affixed. Without being bound by a theory of operation it is believed that this is so because the cutter "disk" is critical to the surface finish, cutter "disk" being a term used in the art of machining meaning the degree of deviation from strict parallelism between the front face of the cutter and the face of the workpiece. In addition, the stacking up of manufacturing tolerances between cutter body, cartridge body and insert serve to present problems difficult, if possible at all, to overcome using a fixed-pocket design. The feasible use of a fixed-pocket design is further diminished due to the inability to predict exactly what degree of disk will best serve each machining application. It is desirable to also overcome these problems by providing an improved adjustable cartridge.

Machining tools having adjustable features are known. For example, U.S. Pat. No. 3,885,282 to Pataky describes a machining tool including a holder and insert to which a cutting tool can be attached. The insert is rotatably mounted in a recess in the holder and fixed in a desired position relative to the holder by a locking screw. Rotatable adjustment of the insert allows for the altering of the tip working angle. In U.S. Pat. No. 4,631,994 to Jester et al a linearly and angularly adjustable holder for a cutting tool is provided. Such tool permits pivotal adjustment by means of an adjustment screw having a threaded portion seated in a basic element and a head which engages a recess in a rotatably mounted receptable element which holds a cutting tool insert. Rotation of the adjustment screw causes rotation of the receptacle element. However, the structure described in these patents is not directed to the significance of the cutter disk as described herein. For example, the cutter disk has a significant effect on the quality of the surface of the workpiece because the depth of the scallops which are produced during the cutting operation is determined by the cutter disk. Although zero disk would provide an ideal surface finish, such factors as tool wear, scraping, characteristics of the workpiece material, and the machine tool itself make it impossible to achieve zero rms. It is therefore an object of the present invention to provide an adjustable cartridge which approaches a zero disk to the extent possible. By providing an adjustable cartridge which allows the insert face to be close to parallelism with the workpiece face the desired finish can be achieved. It is also desirable to provide disk adjustment in combination with radial and axial adjustment to obtain optimum tracking. It is further desirable to provide an adjustable cartridge which is properly balanced particularly in high spaced operations. None of the prior art deals with these considerations.

SUMMARY OF THE INVENTION

This invention achieves these and other objects by providing a machining tool comprising a cartridge including a first end and an opposite second end, a front portion and a rear portion, and a top portion and a bottom portion. The front portion includes a first recessed area at the first end. Such first recessed area is defined or bound by a first surface which is parallel to the rear portion and spaced from the front portion, and a partial cylindrical inner wall facing the first end. A first aperture is providing extending from the top portion towards the bottom portion adjacent the partial cylindrical wall. Such first aperture has a first diameter towards the top portion of the cartridge and a second diameter towards the bottom portion of the cartridge, the first diameter being greater than the second diameter and providing an opening between the first aperture and the first recessed area. An anvil for a cutting insert is also provided, the anvil including a forward portion and a rearward portion, a first side portion and a second side portion each extending between the forward portion and the rearward portion, and a partial cylindrical side wall extending from the first side portion to the second side portion. Such forward portion includes a second recessed area defined by a second surface and at least one cutting insert retaining wall. The anvil further includes a slotted portion extending into the anvil from the partial cylindrical side wall. The anvil is moveably affixed within the first recessed area such that the partial cylindrical side wall is in sliding contact with, and has a common axis with, the partial cylindrical inner wall. The diameter of such partial cylindrical inner wall is only slightly greater than the diameter of the partial cylindrical side wall to allow the partial cylindrical side wall to mate with and slide upon the partial cylindrical inner wall. A threaded adjustment screw is provided which extends into the first aperture and the opening, and the slotted portion of the anvil, for engaging the anvil to cause sliding of the partial cylindrical side wall relative to the partial cylindrical inner wall to rotate the anvil about its axis.

DESCRIPTION OF THE PREFERRED EMBODIMENT

Figure 1:
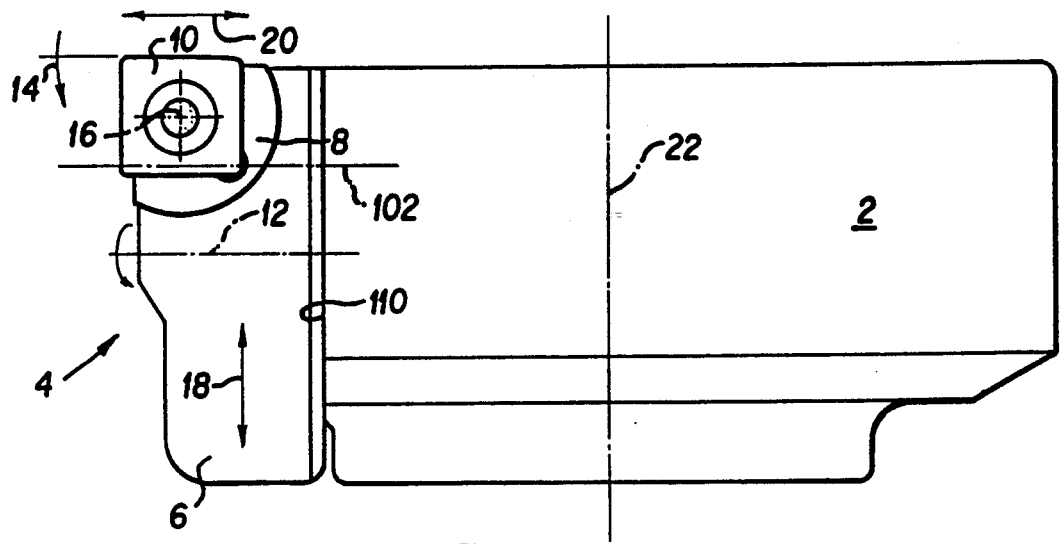
FIG. 1 is a diagrammatic view of a cutter body having a machining tool attached thereto.

The embodiment which is illustrated in FIG. 1 is particularly suited for achieving the objects of this invention. FIG. 1 diagrammatically depicts a cutter body 2 of a type known in the art and a machining tool 4 attached thereto. Machining tool 4 includes a cartridge 6, an anvil 8, a cutting insert 10, and means (not shown) extending along axis 12 for rotating the anvil 8 and insert 10 affixed thereto in the direction designated by arrow 14 about axis 16 to obtain the desired disk adjustment. A plurality of machining tools 4 are affixed to the cutter body 2 in a known manner. In addition to disk adjustment, the machining tool 4 can also be caused to move in the direction of arrow 18 to provide the desired axial movement. Such adjustment is known in the art and therefore is not discussed herein. The desired radial adjustment can be effected by causing the machining tool 4 to be moved in the direction of arrow 20 as described hereinafter. In operation, rotation of the cutter body 2 about axis 22 effects cutting by the inserts 10 each of which is affixed to the cutter body 2 by means of a respective cartridge 6 and anvil 8.

Figure 2:
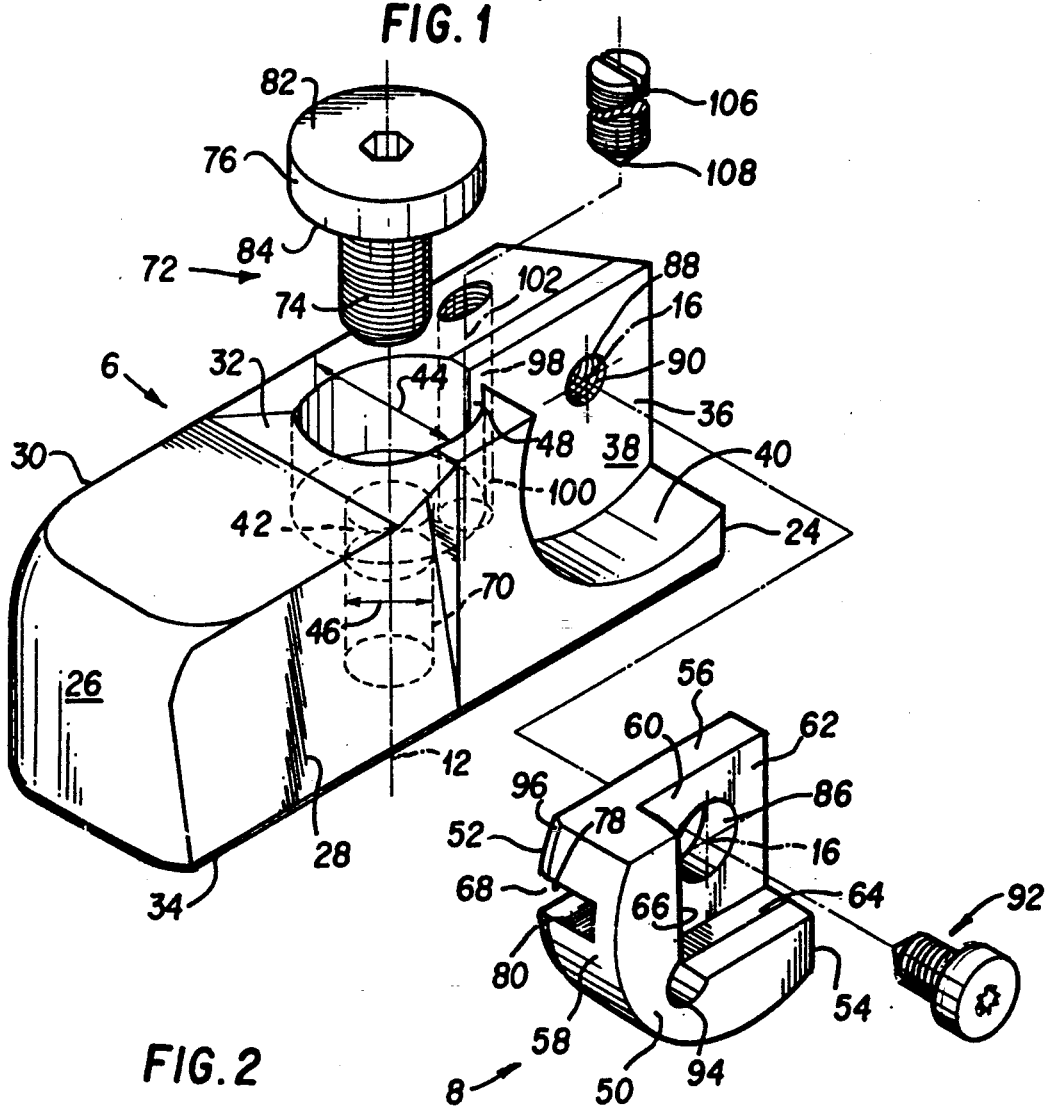
FIG. 2 is an exploded elevational view of the machining tool of the present invention; and, FIG. 3 is a plan view of the machining tool of the type depicted in FIG. 2.
Figure 3:
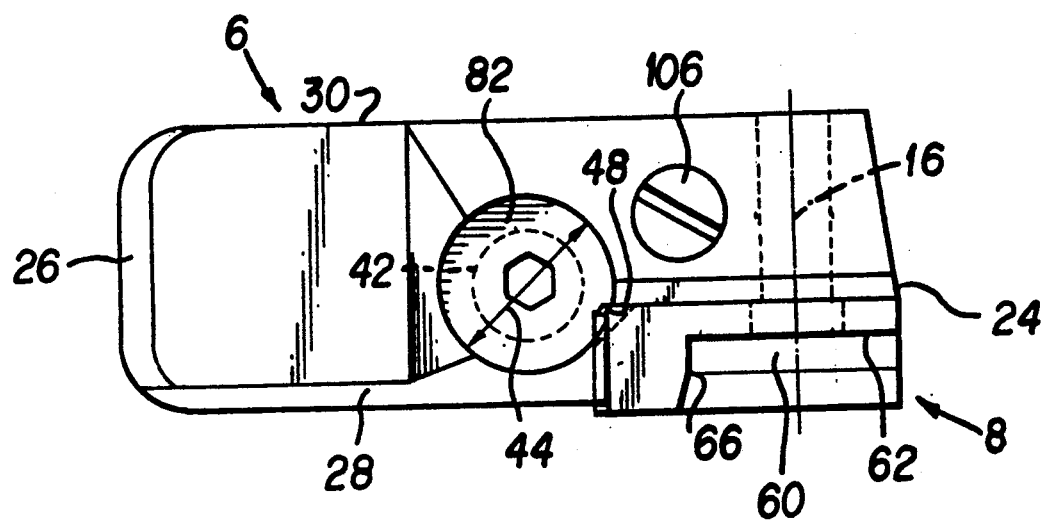

FIGS. 2 and 3 depict the cartridge 6 including a first end 24 and an opposite second end 26, a front portion 28 and a rear portion 30, and a top portion 32 and bottom portion 34. In the preferred embodiment, rear portion 30 is a planar surface. The front portion 28 includes a first recessed area 36 at the first end 24. First recessed area 36 is defined by a first surface 38 which is parallel to rear portion 30 and spaced from front portion 28, and a partial cylindrical inner wall 40 facing first end 24. A first aperture 42 extends from top portion 32 towards bottom portion 34 adjacent the partial cylindrical inner wall 40. First aperture 42 has a first diameter 44 towards said top portion 32 and a second diameter 46 towards said bottom portion 34, diameter 44 being greater than diameter 46 and providing an opening 48 between the first aperture 42 and the first recessed area 36.

FIG. 2 depicts the anvil 8 which supports the cutting insert 10 which is not shown in FIG. 3. Anvil 8 includes a forward portion 50 and a rearward portion 52, a first side portion 54 and a second side portion 56, each extending between the forward portion 50 and rearward portion 52, and a partial cylindrical side wall 58 extending from the first side portion 54 to the second side portion 56. Forward portion 50 of the anvil 8 includes a second recessed area 60 being defined by a second surface 62 and at least one cutting insert retaining wall. Second surface 62 is spaced from forward portion 50 and is preferably parallel to the rearward portion 52. In the embodiment of FIG. 2, the second recessed area 60 is defined by second surface 62, a first cutting insert retaining wall 64 and a second cutting insert retaining wall 66. Anvil 8 further includes a slotted portion 68 extending into the anvil from the partial cylindrical side wall 58.

Anvil 8 is moveably affixed with respect to the first recessed area 36 of cartridge 6 such that the partial cylindrical side wall 58 of the anvil is in sliding contact with, and has a common axis 16 with, the partial cylindrical inner wall 40 of the cartridge. The diameter of the partial cylindrical inner wall 40 is only slightly greater than the diameter of the partial cylindrical side wall 58 to allow side wall 58 to mate with and slide upon the inner wall 40 as described herein.

A threaded adjustment screw is also provided extending into first aperture 42, opening 48, and slotted portion 68, for engaging the anvil 8 to slide the partial cylindrical side wall 58 relative to the partial cylindrical inner wall 40 to rotate the anvil about axis 16. As depicted in FIG. 2, the first aperture 42 is threaded as at 70 which is the portion of the aperture identified as having the smaller diameter 46. Adjustment screw 72 comprises a corresponding threaded shank 74 and an enlarged head 76. Shank 74 is screwed into the first aperture 42 such that the threads of the shank mesh with the threads 70 of aperture 42 and the enlarged head 76 extends into aperture 42 at the portion of aperture 42 identified as having the larger diameter 44. In this manner, the enlarged head 76 also extends into opening 48 and into the slotted portion 68.

In the preferred embodiment, the slotted portion includes an upper surface 78 and an opposing lower surface 80 between which the enlarged head extends. In operation, the top 82 of the enlarged head bears against the upper surface 78 to cause the partial cylindrical side surface 58 to slide in a first direction about axis 16 as shank 74 is screwed out of first aperture 42. In a like manner, the bottom 84 of the enlarged head bears against the opposing lower surface 80 to cause the partial cylindrical side surface 58 to slide in an opposite second direction about axis 16 as shank 74 is screwed into first aperture 42. In this manner, anvil 8 is caused to rotate about axis 16 as desired.

To facilitate such rotation of anvil 8, anvil 8 is provided with an opening 86 extending therethrough along the common axis 16. In a like manner, the cartridge 6 includes a second aperture 88 extending therethrough along the common axis 16. Means is provided extending through opening 86 and second aperture 88 for mounting the cutting insert 10 within the second recessed area 60 and rotatably mounting the anvil 8 within the first recessed area 36 and to the cartridge 6. For example, in the preferred embodiment the second aperture 88 is threaded at 90 and a corresponding threaded shank 92 is provided such that shank 92 extends through opening 86 and is screwed into second aperture 88 by means of the threads 90.

In the preferred embodiment, the first cutting insert retaining wall 64 extends from the first outer portion 54 and the second cutting insert retaining wall 66 extends from the second outer portion 56, such retaining walls extending towards each other and intersecting to form a corner in the second recessed area 60. In the embodiment depicted in the drawings the first and second cutting insert retaining walls 64 and 66 are 90° relative to each other and intersect at such corner which includes a radiused cutaway portion 94. The cut-away portion 94 provides an area within the recessed area 60 into which a corner of the cutting insert 10 can extend as depicted in FIG. 1.

The partial cylindrical side wall 58 of the anvil 8 can also include a bevelled edge 96 adjacent the rearward portion 52 which further facilitates rotation of the anvil as desired.

Referring to FIGS. 1 and 2, the machining tool 4 can be caused to move in the direction of arrow 20 to provide the desired radial adjustment. To this end cartridge 6 includes a third aperture 98 threaded at 100 and extended along axis 102 through the cartridge from the top portion 32 to the bottom portion 34. The third aperture 98 is positioned between the first surface 38 and rear portion 30, and the axis 102 is parallel to the axis 12 of the first aperture 42. In such embodiment a set screw 106 is threaded into aperture 98 such that end 108 of set screw 106 can be caused to bear upon surface 110 of the cutting body 2. Cartridge 6 is caused to move along axis 102 and away from surface 110 by screwing set screw 106 through aperture 98 until end 108 engages surface 110 and then continuing such screwing as the cartridge moves along set screw 106 away from surface 110. The cartridge can be moved towards surface 110 merely by screwing the set screw 106 away from surface 110 and then pushing the cartridge towards surface 110.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A machining tool, comprising:

a cartridge including a first end and an opposite second end, a front portion and a rear portion, and a top portion and a bottom portion, said front portion including a first recessed area at said first end, said first recessed area being defined by a first surface which is parallel to said rear portion and spaced from said front portion, and a partial cylindrical inner wall facing said first end, a first aperture comprising threads and extending from said top portion towards said bottom portion adjacent said partial cylindrical inner wall, said first aperture having a first diameter towards said top portion and a second diameter towards said bottom portion, said first diameter being greater than said second diameter and providing a cartridge opening between said first aperture and said first recessed area;

an anvil for a cutting insert, said anvil including a forward portion and a rearward portion, a first side portion and a second side portion each extending between said forward portion and said rearward portion, and a partial cylindrical side wall extending from said first side portion to said second side portion, said forward portion including a second recessed area being defined by a second surface and at least one cutting insert retaining wall, said anvil further including a slotted portion extending into said anvil from said partial cylindrical side wall, said anvil being moveably affixed within said first recessed area such that said partial cylindrical side wall is in sliding contact with, and has a common axis with, said partial cylindrical inner wall, the diameter of said partial cylindrical inner wall being only slightly greater than the diameter of said partial cylindrical side wall to allow said partial cylindrical side wall to mate with and slide upon said partial cylindrical inner wall; and, an adjustment screw comprising a correspondingly threaded shank and an enlarged head, said correspondingly threaded shank being screwed into said first aperture and said enlarged head extending into said first aperture, said cartridge opening and said slotted portion for engaging said anvil to slide said partial cylindrical side wall relative to said partial cylindrical inner wall to rotate said anvil about said common axis.

2. The machining tool of claim 1 wherein said anvil includes an anvil opening extending therethrough along said common axis and said cartridge includes a second aperture extending therethrough along said common axis, and further including means extending through said anvil opening and said second aperture for mounting a cutting insert within said second recessed area and rotatably mounting said anvil within said first recessed area and to said cartridge.

3. The machining tool of claim 2 wherein said second aperture is threaded and further wherein said mounting means comprises a correspondingly threaded shank extending through said anvil opening and screwed into said second aperture.

4. The machining tool of claim 1 wherein said slotted portion includes an upper surface and an opposing lower surface, between which said enlarged head extends, said enlarged head bearing against said upper surface to cause said partial cylindrical wall to slide in a first direction as said correspondingly threaded shank is screwed out of said first aperture, and bearing against said opposing lower surface to cause said partial cylindrical side wall to slide in an opposite second direction as said correspondingly threaded shank is screwed into said first aperture.

5. The machining tool of claim 4 wherein said cartridge includes a threaded third aperture extending through said cartridge from said top portion to said bottom portion, said third aperture being positioned between said first surface and said rear portion and having an axis which is parallel to an axis of said first aperture, and further including a set screw threaded into said third aperture from said top portion.

6. The machining tool of claim 1 wherein said rear portion is planar.

7. The machining tool of claim 5 wherein said rear portion is planar.

8. The machining tool of claim 4 wherein said second recessed area is defined by a first cutting insert retaining wall and a second cutting insert retaining wall.

9. The machining tool of claim 8 wherein said first cutting insert retaining wall extends from said first side portion and said second cutting insert retaining wall extends from said second side portion.

10. The machining tool of claim 9 wherein said first cutting insert retaining wall and said second cutting insert retaining wall intersect to form a corner in said second recessed area.

11. The machining tool of claim 10 wherein said first cutting insert retaining wall and said second cutting insert retaining wall are 90° relative to each other.

12. The machining tool of claim 11 wherein said corner includes a radiused cut-away portion.

13. The machining tool of claim 12 wherein said rear portion is planar.

14. The machining tool of claim 13 wherein said partial cylindrical side wall includes a bevelled edge adjacent said rearward portion.

15. The machining tool of claim 12 wherein said cartridge includes a threaded third aperture extending through said cartridge from said top portion to said bottom portion, said third aperture being positioned between said first surface and said rear portion and having an axis which is parallel to an axis of said first aperture, and further including a set screw threaded into said third aperture from said top portion.

16. The machining tool of claim 4 wherein said anvil includes an anvil opening extending therethrough along said common axis and said cartridge includes a second aperture extending therethrough along said common axis, and further including means extending through said anvil opening and said second aperture for mounting a cutting insert within said second recessed area and rotatably mounting said anvil within said first recessed area and to said cartridge.

17. The machining tool of claim 16 wherein said second aperture is threaded and further wherein said mounting means comprises a correspondingly threaded shank extending through said anvil opening and screwed into said second aperture.

* * * * *